United States Patent [19]

Drori

[11] 4,026,806
[45] May 31, 1977

[54] FILTER INCLUDING FLUID-FLOW CONTROL

[76] Inventor: Mordeki Drori, 89 Zahal Street, Kiron, Israel

[22] Filed: Apr. 20, 1976

[21] Appl. No.: 678,608

[30] Foreign Application Priority Data

Feb. 16, 1976 Israel .................................. 49040

[52] U.S. Cl. ............................... 210/405; 210/429; 210/447; 210/488
[51] Int. Cl.² ......................................... B01D 25/30
[58] Field of Search ............ 210/97, 106, 405, 418, 210/429, 431, 446, 488, 447

[56] References Cited

UNITED STATES PATENTS

| | | | |
|---|---|---|---|
| 2,793,753 | 5/1957 | Jay | 210/429 X |
| 3,397,794 | 8/1968 | Toth et al. | 210/488 |
| 3,789,990 | 2/1974 | Drori | 210/310 |

*Primary Examiner*—Frank W. Lutter
*Assistant Examiner*—William A. Cuchlinski, Jr.
*Attorney, Agent, or Firm*—Benjamin J. Barish

[57] ABSTRACT

A fluid filtering device comprises an inner member having an inner axial passageway for the fluid, and an outer housing radially spaced from the inner member to define therewith an outer axial passageway for the fluid, the inner member being formed with a radial passageway providing a communicating path between the two axial passageways for the fluid. A filter is disposed with the device upstream of the radial passageway in the path of the fluid flowing through the passageway, and a deflector is disposed within the axial passageway of the inner member on the upstream side of its radial passageway to deflect the fluid to flow through the radial passageway and through the filter. The deflector has a cylindrical wall disposed within the inner member and extending axially thereof, and a transverse wall extending transversely across the axial passageway of the inner member. A fluid flow control member is movable with respect to the cylindrical wall of the deflector and the radial passageway of the inner member to control the flow of the fluid through the radial passageway and through the filter.

10 Claims, 4 Drawing Figures

FILTER INCLUDING FLUID-FLOW CONTROL

BACKGROUND OF THE INVENTION

The present invention relates to filters, and particularly to a fluid filtering device which also performs a fluid-flow control function.

One application for which the invention is particularly useful is with respect to filters used in water irrigation lines. These filters must be periodically cleaned, and to do so, a separate valve installation is generally required to turn-off the water supplied to the filter to enable the filter to be opened and its filtering elements cleaned. Another application of the invention is in water irrigation lines requiring a filtering action and also a pressure regulating action to maintain a substantially constant pressure in the line. Separate filters and pressure regulators are usually provided, but this involves substantial manufacturing costs, as well as installation and maintenance costs, in producing, installing and maintaining separate units.

BRIEF SUMMARY OF THE INVENTION

An object of the present invention is to provide a fluid filtering device which also performs fluid-flow control functions and therefore obviates the need for a separate control unit.

According to the present invention, there is provided a fluid filtering device, comprising an inner member having an inner axial passageway for the fluid and an outer housing radially spaced from the inner member to define therewith an outer axial passageway for the fluid. The inner member is formed with a radial passageway providing a communicating path between the two axial passageways for the fluid. A filter is disposed within the device upstream of the radial passageway in the path of the fluid flowing through both passageways. A deflector is disposed within the axial passageway of the inner member on the upstream side of its radial passageway to deflect the fluid to flow through the radial passageway and through the filter, the deflector having a cylindrical wall disposed within the inner member and extending axially thereof, and a transverse wall extending transversely across the axial passageway of the inner member. The device further includes a fluid flow control member movable with respect to the cylindrical wall of the deflector and the radial passageway of the inner member to control the flow of the fluid through said radial passageway and through the filter.

In the preferred embodiment of the invention described below, the fluid flow control member includes a cylindrical sleeve movable axially of the inner member to control the flow of fluid through the radial passageway.

Two embodiments of the invention are described wherein the fluid flow control member is a shut-off valve effective, when in a projected position with respect to the cylindrical wall of the deflector, to block the flow of fluid through the radial passageway. Such devices are particularly useful for shutting-off the water supplied to the filter elements to enable their cleaning.

Two further embodiments of the invention are described below wherein the fluid flow control member is a spring-biassed pressure regulator effective to regulate the flow of fluid through the radial passageway to maintain a substantially constant outlet pressure.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
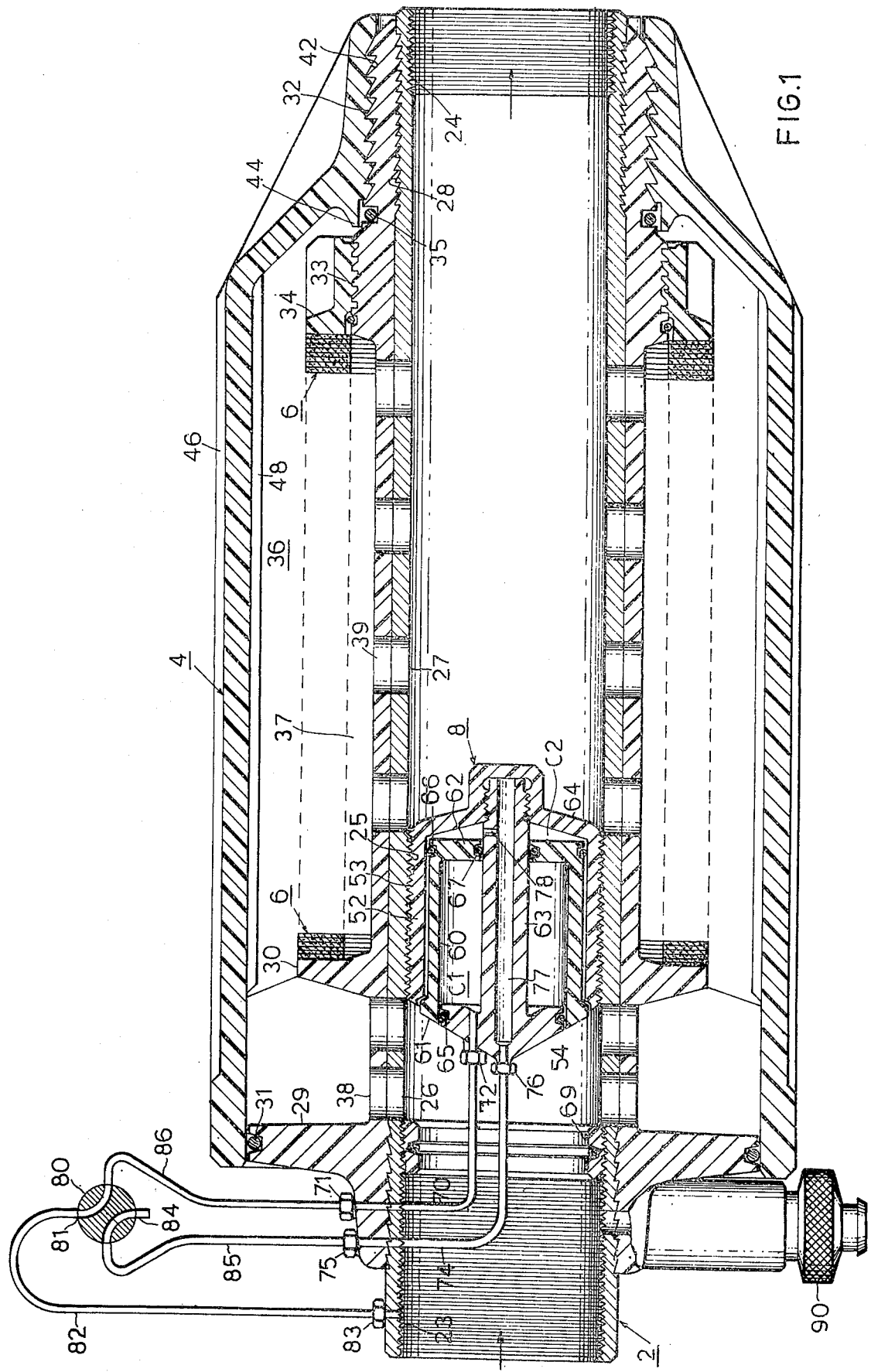
FIG. 1 is a longitudinal sectional view of one form of combined filtering and shut-off device constructed in accordance with the invention.

The filter illustrated in the drawings is of the type described in my U.S. Pat. No. 3,789,990, for purposes of example, but it will be appreciated that the invention could advantageously be used with respect to other filter structures.

With reference to FIG. 1, the device therein illustrated includes an inner rigid member generally designated 4, a filter body generally designated 6 disposed between the inner member 2 and the outer tubular housing 4, and a deflector generally designated 8 disposed within the inner rigid member 2.

The inner member 2 is constituted of a central rigid metal tube 21 and an outer plastic body 22 bonded thereto. Metal tube 21 is formed with an axial passageway 21' extending therethrough and with internal threads 23, 24 at its opposite ends for connection between two fluid pipes (not shown) carrying the fluid (e.g., water, petroleum, or gases) to be filtered. Tube 21 is further formed with internal threads 25 for threadingly receiving the deflector 8, the latter being externally threaded for this purpose. Finally, metal tube 21 has one or more openings 26 extending through its wall at one side of deflector 8, and a plurality of openings 27 extending through its wall at the opposite side of the deflector. The outer plastic body 22 may be injection-molded onto metal tube 21 so as to be firmly bonded thereto, and the outer surface of the metal tube 21 may be threaded or corrugated at its opposite ends 28 for this purpose.

Plastic body 22 is formed with an annular wall 29 extending radially outwardly adjacent to one end of metal tube 21, and with an annular shoulder 30 between openings 26 and 27 of the metal tube. The outer surface of annular wall 29 is grooved for the reception of a sealing ring 31 adapted to be engaged by the corresponding end of the outer tubular housing 4. The opposite end of plastic body 22 is externally threaded, as shown at 32, for removably receiving the corresponding end of tubular housing 4, the latter being internally threaded for this purpose. Further external threads 33 are formed in plastic body 22 for receiving a locking ring 34, and an additional annular recess is formed between threads 32 and 33 for receiving a sealing ring 35.

The filter body 6 is firmly pressed against annular shoulder 30 by locking ring 34. The shoulder, locking ring, and filter all have an external diameter smaller than the internal diameter of the outer tubular housing 4 to define an annular chamber serving as an axial passageway 36 between the filter and housing. The filter body 6 is preferably constituted of a plurality of grooved annular discs held between shoulder 30 and locking ring 34. In addition, the outer surface of plastic body 22 includes a plurality of axial ribs 37 between the shoulder and locking ring to space the inner surface of the filter discs from the outer surface of the plastic member. This member is further formed with a plurality of openings 38, 39 aligned with openings 26, 27 in the metal tube 21 to provide radial passageways communicating with axial passageway 36 at each side of deflector 8.

The outer tubular housing 4 is formed with internal threads 42 cooperable with threads 32 of plastic body 22 for removably attaching the housing thereto. The opposite end of housing 4 is of larger diameter, and has a smooth internal surface to enable it to be slidingly received over annular wall 29, sealing ring 31 effecting a seal between the two. In addition, housing 4 includes an internal axial lip 44 received over sealing ring 35 for sealing that end of the housing.

Housing 4 is preferably of plastic material and is formed with external axial ribs 46 and internal axial ribs 48 for strengthening purposes.

Deflector 8 includes an annular wall 52 externally threaded at 53 to cooperate with thread 25 of the metal tube 21, and a conical front wall 54 extending transversely across the axial passageway 21' defined by the metal tube.

In my above-cited U.S. Pat. No. 3,789,990 the conical front wall 54 constitutes the deflecting element and is made of a single continuous member integrally joined with the cylindrical wall 52. In the FIG. 1 embodiment of the present invention, this conical wall 54 is radially spaced from cylindrical wall 52 of the deflector. Disposed within the space between the two is a fluid-flow control member which is adapted to be actuated to control the flow of fluid through radial passageways 26, 38.

In FIG. 1, the above fluid-flow control member is in the form of a cylindrical sleeve 60 movable between elements 54, 52 of the deflector and having a tapered face 61 which is flush with and a continuation of the corresponding faces of these two elements so as to define a substantially continuous conical surface. The opposite face of the fluid-flow control member 60 is in the form of a transverse wall 62 having a central aperture receiving a stem 63 integral with conical wall 54 and threadedly received within a socket formed in a rear wall 64 extending transversely of cylindrical wall 52 of the deflector. O-rings 65, 66, 67 effect a seal between sleeve 60, and form a compartment C1 between it and the conical front wall 54, and a second compartment C2 between it and transverse wall 64 of the deflector.

The device further includes an annular ring 68 threadedly received within threads 23 of the inner metal tubr 21. The inner face of ring 68 is formed with an annular groove sealing another O-ring 69.

Water pressure may be introduced into compartment Cl via a tube 70 connected between external connector 71 and deflector connector 72. Water pressure may be introduced into compartment C2 via another tube 74 connected between external connector 75 and deflector connector 76, this path of the water including a passageway 77 extending axially through stem 63 and a further passageway 78 extending radially through the stem.

A valve 80, having a "pressure" inlet 81 connected to water line pressure via tube 81 and connector 83, an atmospheric vent 84, and connections to connectors 71, 75 via tubes 85, 86, may be used to control the device in the following manner:

When valve 90 is in the position illustrated, the fluid flow control sleeve 60 will be in its illustrated retracted position. A path of water flow is thus produced through: the inlet end (left) of axial passageway 21' of the inner member 2; the radial passageway defined by openings 26, 38; the outer axial passageway 36; the filter body 6; the radial passageway defined by openings 27, 39; and then out through the exit end of axial passageway 21. In this position of sleeve 60, compartment C2 is vented to the atmosphere via tubes 74 and 85; whereas compartment C1 is subjected to the water line pressure via tubes 70, 86 and 82.

Now, when it is desired to shut-off the flow of water through the filter to enable cleaning it, valve 80 is rotated 90° by means of its knob 88, whereupon compartment C1 is vented to the atmosphere, and compartment C2 is subjected to the water line pressure. This moves sleeve 60 axially (leftwardly) to the broken-line position wherein its outer surface engagges O-ring 69 of annular ring 68, thereby terminating the flow through radial passageways 26, 38 to the interior of housing 46 and to the filterbody 6 within the housing.

After the flow of water to the filtering device is thus shut-off, the device may be disassembled to enable cleaning its interior. Cleaning is done by applying a jet of water to all the interior parts, and for this purpose a tap 90 is also provided on the upstream side of the radial passageways defined by openings 26, 38, to receive a water hose having a spraying nozzle (not shown).

It will thus be seen that the device illustrated in FIG. 1 substantially facilitates cleaning the filter by providing a shut-off control within the filter itself for terminating the flow through the filter, and by further providing a tap for connecting the cleaning hose.

Figure 2:
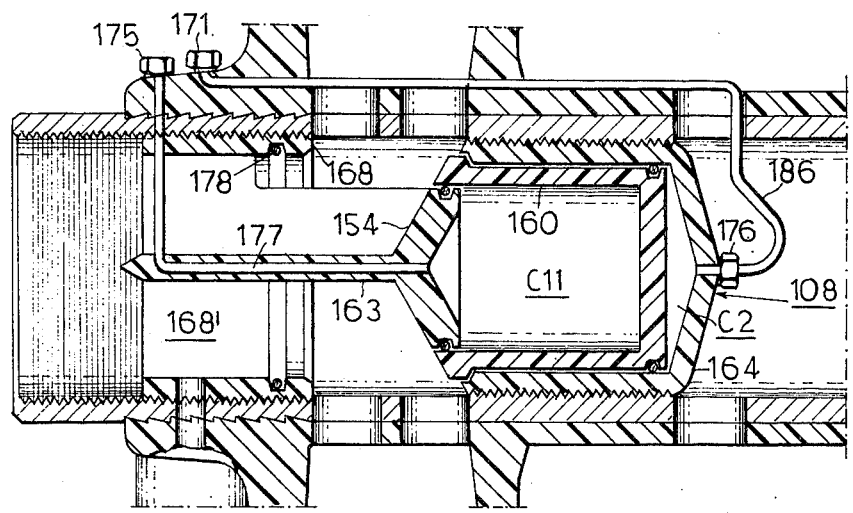
FIG. 2 is a fragmentary sectional view of another form of combined filtering and shut-off device constructed in accordance with the invention.

In FIG. 2, which illustrates a modification of the device of FIG. 1, the front conical face 154 of the deflector assembly is made integral with the ring 168 (corresponding to rings 68 of FIG. 1), by means of a plurality (e.g., 3) of axially-extending vanes 168'. Ring 168 includes the seal 169 engagable by sleeve 160 to shut-off the flow, as in FIG. 1. In FIG. 2, compartment C11 communicates with its external connector 175 via a radial passageway 178 extending through one of the vanes and an axial passageway 177 extending through the stem 163 and through the conical wall 154. Chamber C12 communicates with its external connector 171 via a tube 186 leading from that connector to another connector 176 in transverse wall 164 of the deflector 108.

The structure and operation of the device of FIG. 2 are otherwise the same as described above with respect to FIG. 1.

Whereas FIGS. 1 and 2 illustrate the fluid-flow control device included within the filter as being a shut-off valve, it could also be a pressure-regulator. This is shown in FIGS. 3 and 4, respectively.

Figure 3:
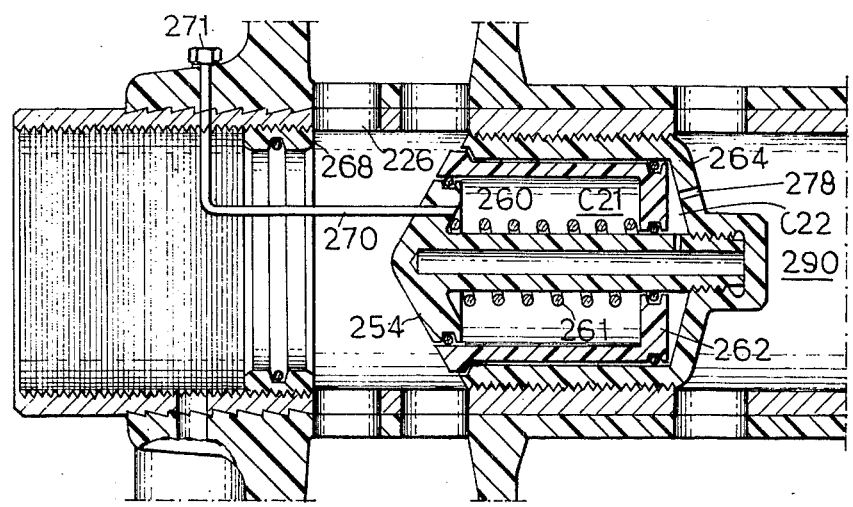
FIGS. 3 and 4 are fragmentary sectional views illustrating how the devices of FIGS. 1 and 2, respectively, may be modified to provide both a filtering and pressure-regulating action.

Thus, as shown in FIG. 3, relating to the FIG. 1 embodiment, sleeve 260 is urged to its fully retracted position by means of a spring 262 and the conical front wall 254. In addition, only chamber C21 is connected to an external connector, this being via tube 270 to connector 271 leading to the atmosphere. Chamber C22 is vented to the interior of the filter 290 by opening 278 formed in wall 264 of the deflector.

It will thus be seen that spring 261 will normally urge sleeve 260 to the illustrated (fully-retracted) position providing the largest area for passageway 226 for the flow of the water. However, if the pressure on the outlet side of the filter device (i.e., the outlet passageway 290) should increase, this increased pressure is transmitted via opening 278 to chamber C22, forcing sleeve 260 to move (leftwardly) towards ring 268, thereby decreasing the water flow through the radial passageway 226. The device of FIG. 3 will therefore act as a combined filter and pressure-regulator, thereby avoiding the need for purchasing, installing and maintaining a separate pressure regulator.

Figure 4:
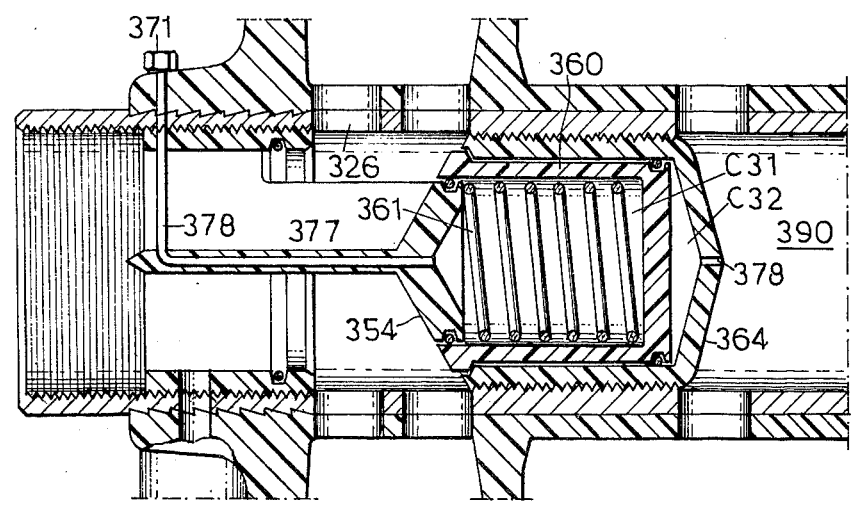

FIG. 4 illustrates the FIG. 2 embodiment modified to also provide a pressure-regulator function with the filtering device. Thus, as shown in FIG. 4, compartment C31 is vented to the atmosphere via connector 371 and passageways 378 and 387; and chamber C32 is vented to the outlet side 390 by means of an opening 378 formed in wall 364 of the deflector. Thus, spring 361 will tend to urge sleeve 360 to its fully retracted position, but in the event of an excessive outlet pressure, this pressure will be applied to compartment C32 tending to move sleeve (leftwardly) towards ring 368 to restrict passageway 326, and thereby to lower the outlet pressure.

Many other variations, modifications, and applications of the illustrated embodiments will be apparent.

What is claimed is:

1. A fluid filtering device comprising: an inner member having an inner axial passageway for the fluid; an outer housing radially spaced from the inner member to define therewith an outer axial passageway for the fluid; said inner member being formed with a radial passageway providing a communicating path between the two axial passageways for the fluid; a filter disposed within the device upstream of the radial passageway in the path of the fluid flowing through said passageways; a deflector disposed within the axial passageway of the inner member on the upstream side of its radial passageway to deflect the fluid to flow through the radial passageway and through the filter; said deflector having a cylindrical wall disposed within the inner member and extending axially thereof, and a transverse wall extending transversely across the axial passageway of the inner member; and a fluid flow control member movable with respect to the cylindrical wall of the deflector and the radial passageway of the inner member to control the flow of the fluid through said radial passageway and through the filter.

2. A device according to claim 1, wherein said fluid flow control member includes a cylindrical sleeve movable axially of the inner member to control the flow of fluid through the radial passageway.

3. A device according to claim 1, wherein the fluid flow control member is a shut-off valve effective, when in a projected position with respect to the cylindrical wall of the deflector, to block the flow of fluid through the radial passageway.

4. A device according to claim 3, further including a tap leading from the axial passageway of the inner member on the upstream side of the radial passageway for connecting a fluid cleaning device to clean the filter when the fluid flow control member has been actuated to block the flow of the fluid through the radial passageway.

5. A device according to claim 1, wherein the fluid flow control member is a spring-biassed pressure-regulator effective to regulate the flow of fluid through the radial passageway to maintain a substantially constant outlet pressure.

6. A device according to claim 1, wherein said inner member includes a second radial passageway downstream of the first-mentioned radial passageway and providing a second communicating path between the two axial passageways for the fluid, the filter being disposed in said second communicating path.

7. A device according to claim 1, further including an annular ring fixed to the inner member within its axial passageway at the upstream side of the radial passageway and cooperable with the movable fluid flow control member to control the flow of fluid through the radial passageway.

8. A device according to claim 7, wherein said deflector includes a conical wall upstream of its transverse wall and radially spaced from its cylindrical wall, said fluid flow control member being movable within said space towards and away from the annular ring.

9. A device according to claim 8, wherein said deflector and annular ring are separate members individually fixed within the inner member on opposite sides of the first-mentioned radial passageway.

10. A device according to claim 8, wherein said conical wall of the deflector and said annular ring are constituted of a single member fixed within said inner member on opposite sides of the first-mentioned radial passageway and joined together by axially extending vanes.

* * * * *